US009083047B2

(12) United States Patent
Lee et al.

(10) Patent No.: US 9,083,047 B2
(45) Date of Patent: Jul. 14, 2015

(54) BINDER COMPOSITION FOR RECHARGEABLE BATTERY, RECHARGEABLE BATTERY EMPLOYING THE SAME AND METHOD OF PRODUCING ELECTRODE FOR RECHARGEABLE BATTERY

(71) Applicant: Samsung SDI Co., Ltd., Yongin (KR)

(72) Inventors: Beomwook Lee, Yongin (KR); Hyesun Jeong, Yongin (KR); Hyeran Lee, Yongin (KR)

(73) Assignee: Samsung SDI Co., Ltd., Yongin-si, Gyeonggi-Do (KR)

( * ) Notice: Subject to any disclaimer, the term of this patent is extended or adjusted under 35 U.S.C. 154(b) by 172 days.

(21) Appl. No.: 13/751,468

(22) Filed: Jan. 28, 2013

(65) Prior Publication Data

US 2013/0260240 A1 Oct. 3, 2013

(30) Foreign Application Priority Data

Apr. 2, 2012 (KR) ........................ 10-2012-0034006

(51) Int. Cl.
| | |
|---|---|
| *H01M 4/13* | (2010.01) |
| *H01M 4/62* | (2006.01) |
| *H01M 4/04* | (2006.01) |
| *H01M 4/139* | (2010.01) |
| *H01M 10/052* | (2010.01) |
| *H01M 4/02* | (2006.01) |

(52) U.S. Cl.
CPC ............ *H01M 4/622* (2013.01); *H01M 4/0419* (2013.01); *H01M 4/0452* (2013.01); *H01M 4/0471* (2013.01); *H01M 4/139* (2013.01); *H01M 4/623* (2013.01); *H01M 10/052* (2013.01); *H01M 2004/021* (2013.01); *Y02E 60/122* (2013.01)

(58) Field of Classification Search
CPC ... H01M 4/0471; H01M 4/622; H01M 4/623; H01M 4/0419; H01M 4/0452
USPC ....................................................... 429/217
See application file for complete search history.

(56) References Cited

U.S. PATENT DOCUMENTS

| | | | | |
|---|---|---|---|---|
| 4,517,069 | A * | 5/1985 | Harney et al. .................. | 204/284 |
| 5,636,437 | A * | 6/1997 | Kaschmitter et al. ........... | 29/825 |
| 7,384,686 | B2 * | 6/2008 | Penneau et al. ............ | 428/317.9 |
| 2007/0099081 | A1 | 5/2007 | Matsuda et al. | |
| 2009/0297948 | A1 | 12/2009 | Dahn et al. | |
| 2009/0304570 | A1 * | 12/2009 | Kim et al. ................. | 423/445 R |
| 2011/0114254 | A1 * | 5/2011 | Xu et al. ........................ | 156/242 |
| 2012/0003533 | A1 | 1/2012 | Dahn et al. | |

FOREIGN PATENT DOCUMENTS

| | | |
|---|---|---|
| KR | 10-0458582 B1 | 11/2004 |
| KR | 10-2006-0127786 A | 12/2006 |
| KR | 10-2009-0103807 A | 10/2009 |
| KR | 10-2011-0031291 A | 3/2011 |

* cited by examiner

*Primary Examiner* — Jonathan Jelsma
(74) *Attorney, Agent, or Firm* — Knobbe Martens Olson & Bear, LLP

(57) ABSTRACT

In one aspect, a binder composition for a rechargeable battery, a rechargeable battery employing the same and a method of producing an electrode of the rechargeable battery is provided.

15 Claims, 1 Drawing Sheet

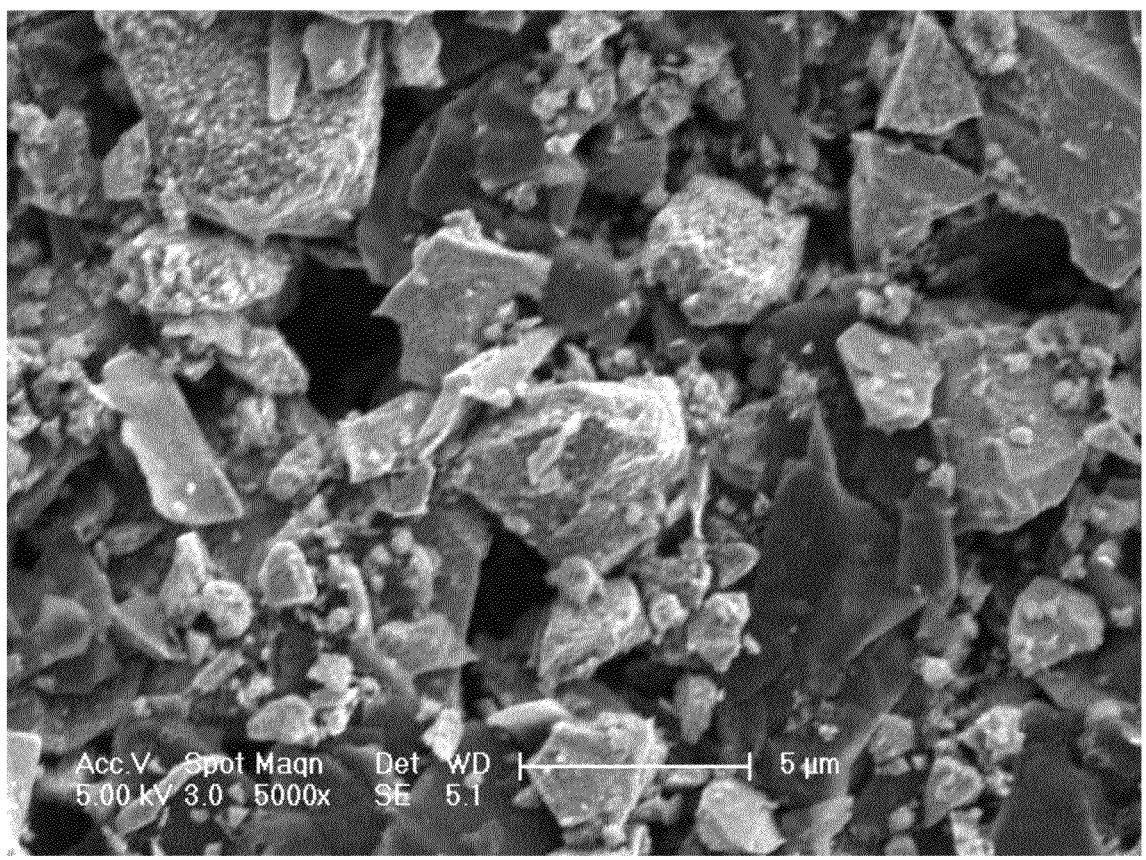

BINDER COMPOSITION FOR RECHARGEABLE BATTERY, RECHARGEABLE BATTERY EMPLOYING THE SAME AND METHOD OF PRODUCING ELECTRODE FOR RECHARGEABLE BATTERY

CROSS-REFERENCE TO RELATED APPLICATION

This application claims the benefit of Korean Patent Application No. 10-2012-0034006 filed on Apr. 2, 2012, in the Korean Intellectual Property Office, the disclosure of which is incorporated herein in its entirety by reference.

BACKGROUND

1. Field

One or more embodiments relate to a binder composition for a rechargeable battery, a rechargeable battery employing the same and a method of producing the same.

2. Description of the Related Technology

Rechargeable batteries having large capacity and cycle life characteristics are in demand to include in smaller, lighter, and higher performance portable devices. To cope with the demand, a great deal of efforts is being exerted to find new active materials for a negative electrode capable of achieving a high capacity, including silicon, a silicon-silicon oxide composite, a silicon-graphite composite, a tin-based material, and alloys thereof, as alternatives of conventional graphite-based active materials. Currently, several rechargeable battery products employing a small amount of the silicon-silicon oxide composite as the negative electrode active material are commercially available.

However, compared to a graphite-based active material, the aforementioned materials capable of achieving a high capacity cause a considerable volumetric change during charging and discharging of the rechargeable battery. Thus, achieving a desired capacity using a conventional rechargeable battery may be impeded by a variety of restrictions.

In order to overcome problems associated with the use of the high-capacity negative electrode active material, binders may be used. For example, a conventional binder may be used in a large amount relative to the conventional graphite-based active material. Accordingly, an amount of the active material used may be reduced relative to a binder, offsetting any capacity increasing effect. In addition, since pores formed in the electrode may not be uniformly sized or distributed, an electrolyte immersion speed may also be lowered.

SUMMARY

Some embodiments provide a binder composition for a rechargeable battery, a rechargeable battery employing the same and a method of producing the same. In certain embodiments the binder composition can facilitate electrolyte dipping even in an electrode using a material capable of achieving a high capacity, which can improve cycle life by maintaining a conductive path by uniformly eliminating strains generated when an active material expands and shrinks during charging/discharging of the battery through the uniformly distributed pores, and which can increase battery capacity by using the active material in a larger amount than in an electrode not having uniformly distributed pores.

Some embodiments provide a binder composition for a rechargeable battery, the binder composition including a solvent-insoluble pore forming material and a solvent-soluble polymer, wherein the solvent-insoluble pore forming material may be pyrolyzed. In certain embodiments, the solvent-insoluble pore forming material may be pyrolyzed at less than 400° C. under vacuum, and the solvent-soluble polymer may not be pyrolyzed at less than 400° C. under vacuum.

Some embodiments provide a rechargeable battery including a positive electrode, a negative electrode: and an electrolyte, wherein at least one of the positive electrode and the negative electrode includes a porous electrode including a binder composition as disclosed and described herein.

Some embodiments provide a method of producing an electrode of a rechargeable battery, the method including preparing an electrode active material slurry by mixing an electrode active material and a binder composition, and coating the electrode active material slurry on a electrode current collector and drying, wherein the binder composition is the binder composition as disclosed and described herein.

In certain embodiments, the binder composition can facilitate electrolyte dipping by forming an electrode having uniformly distributed and sized pores. In certain embodiments, a conductive path can be maintained by uniformly eliminating strains generated when an active material expands and shrinks during charging/discharging of the battery through the uniformly distributed pores, thereby improving the cycle life of the battery when the electrode includes uniformly distributed pores.

In certain embodiments, the binder composition may include the active material in a larger amount than in an electrode not having uniformly distributed pores thereby increasing battery capacity.

In certain embodiments, the binder composition may be capable of forming pores uniformly distributed in an electrode fabricated by pyrolyzing a pore forming material by a simple process of annealing at a high temperature in the course of producing the electrode.

BRIEF DESCRIPTION OF THE DRAWINGS

The accompanying drawings are included to provide further understanding of the present disclosure, and are incorporated in and constitute a part of this specification. The drawings illustrate certain embodiments of the present disclosure and, together with the description, serve to explain principles of the present disclosure, in which:

FIG. 1 is a scanning electronic microscope (SEM) photograph showing a surface of a porous electrode having uniformly sized and distributed pores according to an embodiment.

DETAILED DESCRIPTION

Reference will now be made in detail to certain embodiments of the present disclosure.

Some embodiments provide a binder composition including a solvent-insoluble pore forming material and a solvent-soluble polymer. In certain embodiments, the solvent-insoluble pore forming material is pyrolyzed at less than 400° C. under vacuum, and the solvent-soluble polymer is not pyrolyzed at less than 400° C. under vacuum. In certain embodiments, the solvent-insoluble pore forming material is pyrolyzed at less than 400° C. under vacuum. In certain embodiments, the solvent-soluble polymer is not pyrolyzed at less than 400° C. under vacuum.

What the solvent-insoluble pore forming material is pyrolyzed at less than 400° C. means that since the temperature when the solvent insoluble pore forming material is pyrolyzed is less than 400° C., the solvent insoluble pore forming material is completely pyrolyzed before the temperature reaches at 400° C. Accordingly, the solvent insoluble pore forming material is completely pyrolyzed at 400° C. and above.

Also, what the solvent-soluble polymer is not pyrolyzed at less than 400° C. means that since the solvent-soluble polymer does not become pyrolyzed at less than 400° C., the solvent-soluble polymer exists unpyrolyzed status before the temperature reaches at 400° C.

In certain embodiments, the binder composition may be used in preparing a positive electrode or a negative electrode, or a positive electrode and a negative electrode. In certain embodiments, the binder composition may be used in forming a negative electrode.

In certain embodiments, an electrode using the binder composition as a binder may be formed into a porous electrode. In certain embodiments, the porous electrode has pores each having a size of several micrometers (pm) uniformly distributed. In certain embodiments, the pores may be included in the electrode in a portion of 5 to 30% by volume based on the total volume of the electrode.

In certain embodiments, the uniformly sized and distributed porous electrode may be formed using the binder composition including a solvent-soluble polymer and a solvent-insoluble pore forming material.

Solvent-Soluble Polymer

In certain embodiments, the solvent-soluble polymer may have excellent resistance against pyrolysis. In certain embodiments, the solvent-soluble polymer may not be pyrolyzed up to approximately 400° C. under vacuum or the solvent-soluble polymer may be pyrolyzed in an amount of less than 10% based on the initial weight of the binder at an initial reaction stage.

Examples of the solvent-soluble polymer may include one or more components selected from the group consisting of poly(acrylether ketones), poly(arylamides), aromatic polyamides, aromatic poly(amide-imides), aromatic polyurethanes, aromatic polyesters, polybenzimidazoles, polybenzoxazoles, polybenzothiazoles, aromatic polysulfones, aromatic poly(ethersulfones), aromatic poly(phenylene sulfides) or aromatic polyphosphazene, and modified products of the listed polymers such as the polymer having a fluoride substituted, the polymer having a sulfone group (—SO$_2$—) in a main chain, or the polymer having another polymer added thereto to form a block copolymer. For example, when the solvent is water, the solvent-soluble polymer may include one or more components selected from the group consisting of:

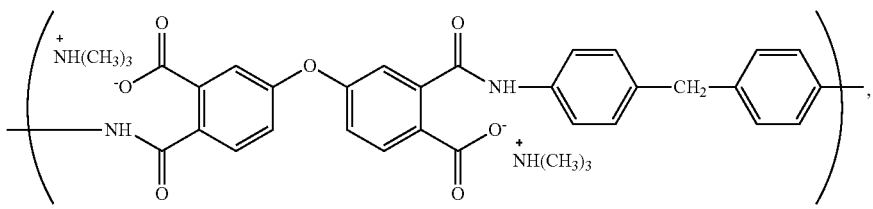

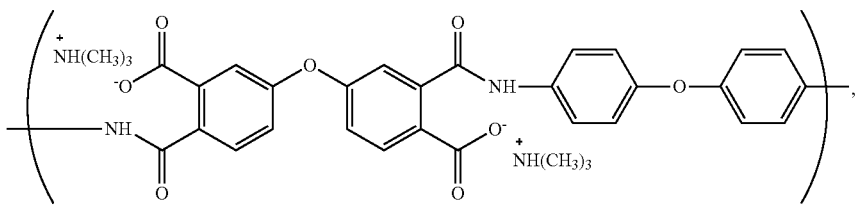

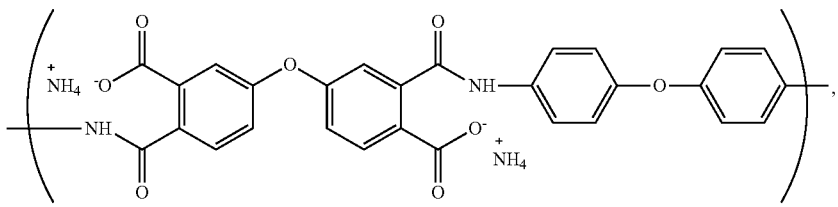

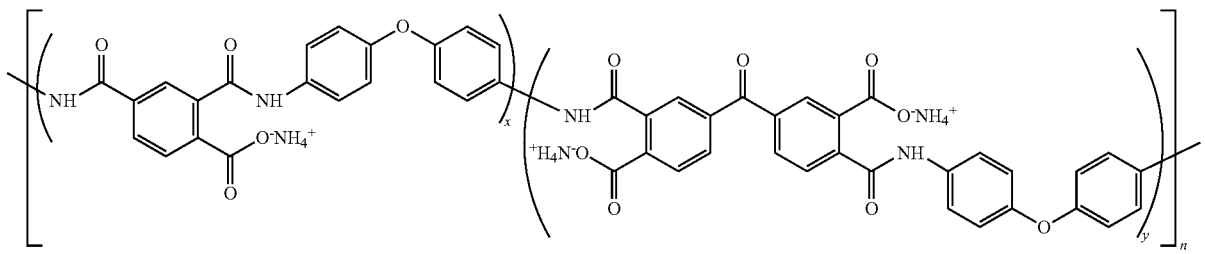

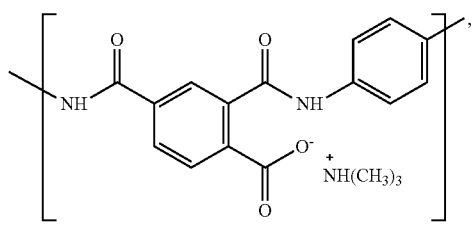

and the like.

In certain embodiments, the solvent-soluble polymer can be prepared by a variety of polymerization methods. In certain embodiments, a slurry may be prepared using a solution polymerization method.

Solvent-Insoluble Pore Forming Material

In certain embodiments, the solvent-insoluble pore forming material may be a material that is not soluble in a solvent used in preparing an electrode slurry. Any material can be used as the solvent-insoluble pore forming material as long as it can be pyrolyzed at a high temperature during annealing after it is coated on an electrode current collector. In certain embodiments, the solvent-insoluble pore forming material may include at least one of poly(methylmethacrylate), poly poly(methylmethacrylate-co-methacrylic acid), poly(methacrylate-co-styrene), poly(methacrylate-co-styrene-co-methacrylic acid), poly(methacrylate-co-n-butylmethacrylate), poly(methacrylate-co-n-butylmethacrylate-co-styrene), poly(n-butylmethacrylate-co-methacrylic acid), poly(butadiene-co-styrene), poly(butadiene-co-acrylonitrile), poly(butadiene-co-styrene-co-acrylonitrile), and the like.

In certain embodiments, pores are formed at locations where the solvent-insoluble pore forming material is dispersed, thereby forming pores uniformly distributed in the electrode as the solvent-insoluble pore forming material is pyrolyzed by high temperature treatment.

In certain embodiments, uniformly distributed pores can be formed in an electrode by mixing the solvent-insoluble pore forming material with the solvent-soluble polymer and evenly stirring in preparing an electrode active material slurry, coating on an electrode current collector and drying, followed by performing pyrolysis.

In certain embodiments, the solvent-insoluble pore forming material may include one kind of a material. In certain embodiments, two or more kinds of different materials may be contained in the solvent-insoluble pore forming material to cause the solvent pore forming material slowly pyrolyzed, thereby preventing the splitting or peeling-off of the electrode layer due to rapid pyrolysis.

In certain embodiments, the solvent-insoluble pore forming material may include a polymer which can be easily pyrolyzed. In certain embodiments, the solvent-insoluble pore forming material may include a polymer that is completely pyrolyzed at approximately 400° C. or less under vacuum or a polymer that is pyrolyzed in an amount of greater than 90% by weight, based on the initial weight of the binder at an initial reaction stage.

In certain embodiments, the solvent-insoluble pore forming material may include only a polymer, or an organic-inorganic hybrid containing an inorganic material.

In certain embodiments, the solvent-insoluble pore forming material may exist in a status such that it is not dissolved but is dispersed in a solution. In certain embodiments, the solvent-insoluble pore forming material may be dispersed in a solution capable of forming pores after forming an electrode.

The present embodiments do not limit the shape of the solvent-insoluble pore forming material. In certain embodiments, the shape of the solvent-insoluble pore forming material may be spherical. In certain embodiments, a spherical shape may provide advantages in pore shape and dispersibility.

In certain embodiments, the solvent-insoluble pore forming material may include nano particles having a particle size of several to several hundreds of nanometers, preferably 10 to 200 nm.

In certain embodiments, a solvent-insoluble pore forming material that is spherically shaped may have a single layered structure having homogeneity in its core and shell, a double layered structure having heterogeneity in its core and shell, or a hollow structure having an empty core.

In certain embodiments, the solvent-insoluble pore forming material may be prepared by various methods, for example, an emulsion polymerization method, a molecular self-assembly method, a method using physical and/or chemical bonds of nano-sized particles, or a vapor polymerization method. In certain embodiments, the solvent-insoluble pore forming material may be prepared by the emulsion polymerization method.

In certain embodiments, the solvent-insoluble pore forming material may be prepared by the emulsion polymerization method. In certain embodiments, a monomer, an emulsifier and a polymerization initiator may be included for facilitating polymerization. In addition, an activator, a molecular weight adjusting agent, and a crosslinking agent may be used as additives.

Monomer

In certain embodiments, monomers having an acryl or vinyl group may be polymerized to produce a polymer.

Examples of the monomer having an acryl group may include at least one selected from the group consisting of an alkyl acrylate exemplified by methyl acrylate, ethyl acrylate, n-propyl acrylate, isopropyl acrylate, n-butyl acrylate, isobutyl acrylate, tert-butyl acrylate, n-pentyl acrylate, n-hexyl acrylate, n-heptyl acrylate, n-octyl acrylate, 2-ethylhexyl acrylate, n-nonyl acrylate, n-decyl acrylate, isodecyl acrylate, lauryl acrylate, stearyl acrylate or a methacrylate-based compound thereof; an alkoxy acrylate exemplified by 2-methoxyethyl acrylate, 2-ethoxyethyl acrylate, 2-methoxyethoxyethyl acrylate, 2-ethoxyethoxyethyl acrylate, 2-acetoxyethyl acrylate, 2-acetoxyethoxy ethyl acrylate or a methacrylate-based compound thereof; an acrylate having at a terminal end a substituent of a hydroxyl, carboxy, amide, or nitrile group, exemplified by 1-hydroxymethyl acrylate, 2-hydroxyethyl acrylate, 3-hydroxypropyl acrylate, 2-hydroxyethoxyethyl acrylate, acrylic acid, 1-carboxylmethyl acrylate, 2-carboxylethyl acrylate, 3-carboxylpropyl acrylate, acrylamide, N,N-dimethylacryl amide, N-methylol acrylamide, N-butoxy methylacrylamide, 1-aminomethyl acrylate, 2-aminomethyl acrylate, 3-aminopropyl acrylate, acrylonitrile, or a methacrylate-based compound thereof.

Examples of the monomer having a vinyl group may include at least one selected from the group consisting of ethylene, propylene, butylene, isobutylene, styrene, α-methylstyrene, styrene sulfonic acid, vinyl acetate, 1,2-butadiene, 1,4-butadiene, isoprene, maleic acid, anhydrous maleic acid, fumaric acid, and crotonic acid.

Emulsifier

In certain embodiments, the emulsifier may be used in an amount of 0.1 to 5.0 wt % relative to a total weight of a polymerization composition. If the amount of the emulsifier is less than 0.1 wt %, the prepared polymer may have increased particle sizes, thereby deteriorating coating efficiency and uniformity during coating after preparing slurry. If the amount of the emulsifier is greater than 5.0 wt %, low temperature pyrolysis characteristics may be hampered due to intrinsic high temperature pyrolysis characteristics of the emulsifier.

Examples of the emulsifier may include aliphatic salts exemplified by sodium or potassium salts of oleic acid, stearic acid, lauric acid and mixed fatty acid, and general anionic emulsifier such as rosin acid. In addition, in order to enhance stability, a nonionic emulsifier, such as one or more polyoxyethylenes, alkylphenols or polyoxyethylene alcohol, may also be used.

In certain embodiments, a reaction type emulsifier capable of improving stability of latex may be added.

In certain embodiments, the reaction type emulsifier may include an anionic emulsifier having allyl, (meth)acryloyl or prophenyl group, a neutral emulsifier and a polymeric emulsifier and specific examples thereof may include at least one sulfate salt of polyoxyethylene allylglycidyl nonylphenyl ether and ammonium sulfate salts.

In certain embodiments, the emulsifier may include sodium dioctyl sulfosuccinate, sodium dodecyl sulfate, sodium dodecyl benzene sulfonate, di-sodium laureth sulfosuccinate, di-sodium cocamido MIPA sulfosuccinate, cocoamphocarcoxyglycinate, sodium lauroly sarcosinate, and TEA cocoylglutamate.

Polymerization Initiator

In certain embodiments, an inorganic or organic peroxide compound may be used as the polymerization initiator, and examples thereof may include a water-soluble initiator such as potassium persulfate, sodium persulfate or ammonium persulfate, and an oil-soluble initiator such as cumen hydroperoxide, or benzoyl peroxide.

In certain embodiments, the polymerization initiator may be used in an amount of 0.001 to 0.5 wt % relative to a total weight of an emulsion polymerization composition.

If the amount of the polymerization initiator is less than 0.001 wt %, polymerization reactivity may be lowered. If the amount of the polymerization initiator is greater than 0.5 wt %, it may be difficult to obtain a polymer having a desired molecular weight.

Activator

Among the additives, an activator may be used to promote initiation of peroxide in cooperation with a polymerization initiator, and examples thereof may include sodium formaldehyde sulfoxylate, sodium ethylene diamine tetraacetate, ferrous sulfate, and dextrose.

In certain embodiments, the activator may be used in an amount equal to or less than an amount of the polymerization initiator.

Polymer Adjusting Agent

Among the additives, the polymer adjusting agent may be used to obtain a desired molecular weight of the polymer, and specific examples thereof may include mercaptanes; terpenes such as terbinolene, dipentene or t-terpinene; chloroform, halogenohydrocarbons such as carbon tetrachloride; and sodium bisulfite ($NaHSO_3$).

In certain embodiments, the polymer adjusting agent may be used in an amount that is generally used in preparing a polymer.

Crosslinking Agent

Among the additives, the crosslinking agent may be used to prevent a polymer from being dissolved in an electrode forming slurry by polymerizing the polymer, and specific examples thereof may include at least one selected from the group consisting of diacrylates such as 1,6-hexanediol diacrylate, 1,6-hexanediol(ethoxylated)diacrylate, 1,4-butane diol diacrylate, 2-butyl-2-ethyl-1,3-propanediol diacrylate, 1,9-nonane diol diacrylate, tripropyleneglycol diacrylate, dipropyleneglycol diacrylate, or tetraethyleneglycol diacrylate; triacrylates such as trimethylolpropane triacrylate, trimethylolpropane(ethoxylated)triacrylate, glycerin (proxylated)triacrylate, pentaerythritol triacrylate, or trimethylolpropane(proxylated)-3-triacrylate; tetraacrylates such as ditrimethylolpropane tetraacrylate, tetramethylolpropane tetraacrylate, or pentaerythritoltetraacrylate; pentaacrylates such as dipentaerythritol pentaacrylate; hexaacrylates such as dipentaerythritol hexaacrylate, or an acrylate crosslinking agent with acrylate of the acrylate crosslinking agent substituted by methacrylate in part or whole, and divinyl benzene.

In certain embodiments, the crosslinking agent may be used in an amount of 20 parts by weight based on 100 parts by weight of the monomer. If the amount of the crosslinking agent exceeds 20 parts by weight, pyrolysis may be hindered.

In certain embodiments, the sum of amounts of the monomer and the crosslinking agent is preferably in a range of from 20 to 60 wt % based on a total weight of the composition including a solvent when the composition is prepared by emulsion polymerization.

In certain embodiments, a degree of polymerization may be lowered, and it is difficult to obtain a polymer having a desired molecular weight if the sum is less than 20 wt %. In certain embodiments, a vigorous reaction may take place if the sum is greater than 60 wt %. Thus, it is difficult to adjust a reaction temperature when the sum is greater than 60 wt %. In some cases, gel formation may occur the sum is greater than 60 wt %, making it difficult to prepare a desired polymer.

Solvent

In certain embodiments, water and alcohols having highly soluble in water may be used in mixture as a solvent in emulsion polymerization. In certain embodiments, water may be used alone as the solvent.

Additional Additives

In certain embodiments, a polymer solution prepared by the emulsion polymerization method may be used by itself, and additives may further be added thereto in order to improve properties of the polymer solution.

In certain embodiments, the additives may include peroxide and ammonia. In certain embodiments, the peroxide may be used in an amount of 0.01 to 2 parts by weight based on 100 parts by weight of solid matter of the polymer prepared by the emulsion polymerization method. When used in the preceding amounts the peroxide can serve to improve pyrolysis characteristics of organic matter. If the amount of peroxide is less than 0.01 parts by weight, the pyrolysis characteristics of organic matter may not be improved. If the amount of peroxide is greater than 2 parts by weight, side reactions with other organic compounds may occur, which is not desirable.

Among the additives, ammonia may be used to adjust pH of the polymer prepared by the emulsion polymerization method. In certain embodiments, film coating efficiency, uniformity and density may be improved during coating after preparing slurry. For example, if ammonia is added to adjust pH to be in a range of from 6.5 to 7.5 film coating efficiency, uniformity and density may be improved during coating after preparing slurry.

Binder Compositions

Some embodiments provide a method of preparing an electrode of a rechargeable battery by coating an electrode active material slurry on an electrode current collector and drying.

In certain embodiments, the slurry for forming the electrode, including the electrode active material may include a binder composition, and the binder composition may include the solvent-soluble polymer and the solvent-insoluble pore forming material.

In certain embodiments, the solvent-soluble polymer and the solvent-insoluble pore forming material may be added independently. In certain embodiments, the solvent-soluble polymer and the solvent-insoluble pore forming material may be used in a pre-mixed state. In certain embodiments, the solvent-insoluble pore forming material may be dispersed in the solvent-soluble polymer to then be used.

In certain embodiments, irrespective of whether the solvent-soluble polymer and the solvent-insoluble pore forming material are used alone or in combination, a single solvent may be used in either case. For example, if the solvent-soluble polymer is prepared using water as the solvent, the solvent-insoluble pore forming material may be prepared using water as the solvent. If different solvents are used in preparing the solvent-soluble polymer and the solvent-insoluble pore forming material, phase separation or sedimentation may occur.

In certain embodiments, the solvent-soluble polymer and the solvent-insoluble pore forming material may be independently prepared and then mixed. In certain embodiments, the solvent-insoluble pore forming material may be first prepared and the solvent-soluble polymer is then prepared using the solvent-insoluble pore forming material.

In certain embodiments, the first method may be simpler than the second method and may be used when the solvent-soluble polymer and the solvent-insoluble pore forming material are uniformly mixed. In certain embodiments, the second method may be used when the solvent-soluble polymer and the solvent-insoluble pore forming material are not uniformly mixed by simply mingling.

In certain embodiments, the solvent-soluble polymer and the solvent-insoluble pore forming material may be mixed in a weight ratio of 50:50 to 95:5 based on the weight of solid matter. If the solvent-soluble polymer is used in a ratio smaller than the weight ratio of 50, pyrolyzed components may increase, resulting in splitting or peeling-off of an electrode layer. If the solvent-soluble polymer is used in a ratio greater than the weight ratio of 95, the desired porosity cannot be achieved.

Additional Binder

In certain embodiments, the binder composition can be used alone. In certain embodiments, the binder composition can also be used in combination with other binders in order to improve dispersibility of an active material, to improve adhesion efficiency between an active material and a current collector, and to improve elasticity.

In certain embodiments, a binder dissolved or dispersed in water may be used in combination with water when water is used as a solvent of the binder composition.

In certain embodiments, the binder used for the binder composition in combination may be a binder that is not pyrolyzed at approximately 400° C., for example, the solvent-soluble polymer.

In certain embodiments, the binder composition may be used in an amount of 50 to 100 wt % based on a total weight of the binder when the binder composition is used in combination with the additional binder. If the amount of the binder composition is less than 50 wt %, desired electrochemical properties such as uniformly distributed pores thereby properties obtained to be achieved by the present invention may not be obtained.

Additional Additives

In certain embodiments, the binder composition for forming an electrode may further include additional additives in order to improve additional properties.

In certain embodiments, the additional additives may include a dispersant, a viscosity agent, a conductive agent and a filler.

In certain embodiments, the respective additives may be used by being pre-mixed with a binder composition for forming an electrode when preparing slurry for forming the electrode. In certain embodiments, the respective additives may be separately prepared and then independently used. Components of the additives to be used are determined by active material and binder components. In some cases, the additional additives may not be used.

In certain embodiments, an amount of the additive may vary according to the kind of active material, components of binder and kind of additive. In certain embodiments, the additive may be used in an amount of 0.1 to 10 wt % based on the weight of binder composition excluding a solvent. If the amount of the additive is less than 0.1 wt %, the effect of adding the additive may not be sufficient. If the amount of the additive is greater than 10 wt %, the amount of the binder components contained in the binder composition for forming an electrode is relatively reduced, so that desired electrochemical properties may not be achieved.

In certain embodiments, the dispersant may include at least one component selected from the group consisting of dispersants capable of improving dispersibility of a positive electrode or negative electrode active material, and a conductive agent in slurry. In certain embodiments, the dispersant may be selected from the group consisting of a cationic dispersant, an anionic dispersant, and a nonionic dispersant. For example, the dispersant may include at least one component selected from the group consisting of a hydrocarbon with 5 to 20 carbon atoms in a lipophilic part, acryl oligomer, ethylene oxide oligomer, propylene oxide oligomer, ethylene oxide, propylene oxide oligomer, and urethane oligomer.

In certain embodiments, the viscosity agent may be added to facilitate coating of the slurry on a current collector when the slurry has low viscosity. Examples of the viscosity agent may include at least one component selected from the group consisting of carboxymethyl cellulose, carboxyethyl cellulose, ethyl cellulose, hydroxymethyl cellulose, hydroxyethyl cellulose, hydroxypropyl cellulose, and polyvinyl alcohol.

In certain embodiments, the dispersant and the viscosity agent may be used in small amounts since the dispersant and the viscosity agent are mostly pyrolyzed at a vacuum drying temperature of 400 to 500° C.

In certain embodiments, the conductive agent may be a component for further improving conductivity of an electrode. In certain embodiments, the conductive agent may be used to impart conductivity to an electrode. Any electrically conductive material can be used as the conductive agent unless it causes a chemical change. In certain embodiments, the at least one conductive material may include a component selected from the group consisting of natural graphite, artificial graphite, carbon nano fiber, carbon black, acetylene black, ketjen black, and metal powder. In certain embodiments, the metal powder may be a powder of copper, nickel, aluminum or silver.

In certain embodiments, the filler may be an auxiliary component for suppressing electrode expansion by improving a strength of a binder and examples thereof may include fibrous materials such as glass fiber, carbon fiber or metal fiber.

Solvent

In certain embodiments, the water may be used as a solvent of the binder composition. In certain embodiments, the solvent may include at least one component selected from the group consisting of N,N-dimethyl formamide, N,N-dimethylacetamide, methylethyl ketone, cyclohexanone, ethyl acetate, butyl acetate, cellosolve acetate, propyleneglycol monomethylether acetate, methylcellosolve, butylcellosolve, methylcarbitol, butylcarbitol, propyleneglycol monomethylether, diethyleneglycol dimethylether, toluene, and xylene.

In certain embodiments, the amount of the solvent is not particularly limited and the solvent may be used in an appropriate amount as long as it may make the slurry have an appropriate level of viscosity.

In certain embodiments, the binder composition for forming an electrode may be combined with the above components properly and then mixed with an electrode active material to prepare slurry.

Electrode Active Material

In certain embodiments, the negative electrode active material may include crystalline carbon, amorphous carbon, or a combination thereof when the electrode is a negative electrode.

Examples of the crystalline carbon include natural graphite and artificial graphite that is in amorphous, plate, flake, spherical, or fibrous form. Examples of the amorphous carbon include soft carbon (carbon sintered at low temperatures), hard carbon, meso-phase pitch carbides, sintered cokes, and the like.

In certain embodiments, the negative electrode active material may be at least one selected from the group consisting of Si, $SiO_x$ (0<x<2), Sn, $SnO_2$, Si-containing metal alloyable with lithium and combinations thereof. Examples of the metal alloyable with lithium include aluminum (Al), tin (Sn), silver (Ag), iron (Fe), bismuth (Bi), magnesium (Mg), zinc (Zn), indium (In), germanium (Ge), lead (Pb), and titanium (Ti).

In certain embodiments, the positive electrode active material may include a material that allows reversible intercalation and deintercalation of lithium ions when the electrode is a positive electrode.

Specific examples of the positive electrode active material may include at least one selected from the group consisting of lithium cobalt oxide ($LiCoO_2$); lithium nickel oxide ($LiNiO_2$); lithium manganese oxide ($Li_{1+x}Mn_{2-x}O_4$, where x is in a range of from 0 to 0.33), $LiMnO_3$, $LiMn_2O_3$, or $LiMnO_2$; lithium copper oxide ($Li_2CuO_2$); lithium iron oxide ($LiFe_3O_4$); lithium vanadium oxide ($LiV_3O_8$); copper vanadium oxide ($Cu_2V_2O_7$); vanadium oxide ($V_2O_5$); Ni-site lithium nickel oxide ($LiNi_{1-x}M_xO_2$, where M=Co, Mn, Al, Cu, Fe, Mg, B or Ga and x=0.01~0.3); lithium manganese composite oxide ($LiMn_{2-x}M_xO_2$, where M=Co, Ni, Fe, Cr, Zn or Ta and x=0.01~0.1 or $Li_2Mn_3MO_8$, where M=Fe, Co, Ni, Cu or Zn); lithium manganese oxide where the Li of $LiMn_2O_4$ is partially substituted with alkaline-earth metal ion; disulfide compound; iron molybdenum oxide ($Fe_2(MoO_4)_3$).

In certain embodiments, the binder for a positive electrode may include a binder composition. In certain embodiments, the, any binder composition can be used as the binder for a positive electrode as long as it allows positive electrode active material particles to be bonded well to one another and with a current collector. For example the binder may include at least one component selected from the group consisting of polyvinyl alcohol, carboxymethylcellulose, hydroxypropylcellulose, diacetylcellulose, polyvinylchloride, carboxylated polyvinylchloride, polyvinylfluoride, ethylene oxide containing polymer, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

Fabrication of Electrodes

In certain embodiments, a slurry for forming an electrode may be coated on a current collector, heated and dried under vacuum to form an electrode active material layer. In certain embodiments, the slurry may be prepared by combining the binder composition and the active material.

In certain embodiments, the coating of the slurry for forming an electrode may be performed using one method selected from the group consisting of screen printing, spray coating, doctor-blade coating, gravure coating, dip coating, silk screening, painting, and slot-die coating according to the viscosity of the slurry.

In certain embodiments, the current collector may be formed to a thickness of 3 to 500 μm.

The current collector is not particularly limited, and may be any materials as long as it has a suitable conductivity without causing chemical changes in the fabricated battery. Examples of the current collector include copper, stainless steel, aluminum, nickel, titanium, sintered carbon, copper or stainless steel that is surface-treated with carbon, nickel, titanium or silver, and aluminum-cadmium alloys.

In certain embodiments, the current collector may be processed to have fine irregularities on the surfaces thereof so as to enhance adhesive strength of the current collector to the negative active material, and may be used in any of various forms including films, sheets, foils, nets, porous structures, foams, and non-woven fabrics.

In certain embodiments, the slurry may be coated on the current collector and then dried. In certain embodiments, the drying may be performed by primary thermal treatment at a temperature of 80 to 120° C. to evaporate a solvent (water or an organic solvent) contained in the composition for forming the negative electrode active material layer.

During the primary thermal treatment, if the temperature is lower than 80° C., it is difficult to remove water as the solvent from the electrode. If the temperature is higher than 120° C., water as the solvent is rapidly evaporated, generating bubbles on the electrode surface and resulting in reduced uniformity on the electrode surface.

In certain embodiments, the drying may be performed under ambient atmosphere.

In certain embodiments, secondary thermal treatment may be performed under vacuum after the solvent contained in the composition for forming the negative electrode active material layer is completely removed by the primary thermal treatment.

In certain embodiments, the secondary thermal treatment may be performed at a temperature of 400 to 500° C. under vacuum of $1\times10^{-4}$ to $1\times10^{-6}$ torr, thereby allowing the solvent-insoluble pore forming material to be removed by pyrolysis.

Fabrication of Rechargeable Batteries

Some embodiments provide a rechargeable battery including an electrode. In certain embodiments, the rechargeable battery may include a negative electrode, a positive electrode, a separator, and a lithium salt containing non-aqueous electrolyte.

Separator

In certain embodiments, the separator may be interposed between the positive electrode and the negative electrode, and may be formed of an insulating thin film having high ionic transmissivity and mechanical strength.

In certain embodiments, the separator may generally have a pore diameter in a range of from 0.01 to 10 μm and a thickness in a range of from 5 to 300 μm. Examples of the separator may include an olefin-based polymer having chemical resistance and hydropobicity, such as polypropylene; a sheet or a nonwoven fabric made. In certain embodiments, the separator may be glass fiber or polyethylene. In certain embodiments a polymer may be used as an electrolyte and as a separator as well.

Specific examples of the olefin-based polymer separator may include a single-layered film of polyethylene, polypropylene or polyvinylidene fluoride, a multi-layered film of two or more of these films, a composite multi-layered film such as a polyethylene/polypropylene 2-layered separator, a polyethylene/polypropylene/polyethylene 3-layered separator, or a polypropylene/polyethylene/polypropylene 3-layered separator.

Non-Aqueous Electrolyte

In certain embodiments, the lithium salt containing non-aqueous electrolyte may include a non-aqueous electrolyte and a lithium salt.

In certain embodiments, a solid electrolyte, or an inorganic solid electrolyte may be used as the non-aqueous electrolyte, a non-aqueous electrolytic solution.

In certain embodiments, the non-aqueous electrolyte may be any aprotic organic solvent. In certain embodiments, the non-aqueous electrolyte may be one or more components selected from the group consisting of N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethylsulfoxide, 1,3-dioxorone, formamide, dimethyl formamide, dioxorone, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyester sulfide, polyvinyl alcohols, polyvinylidene fluoride, and polymers containing ionic dissociation groups.

Examples of the inorganic solid electrolyte may include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

In certain embodiments, the lithium salt may be any lithium salt that is commonly used in a lithium battery, and that is soluble in the above-mentioned lithium salt-containing non-aqueous electrolyte. For example, the lithium salt may include at least one selected from the group consisting of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower aliphatic carboxylic acid lithium salt, lithium tetraphenyl borate, imide and the like. In certain embodiments, pyridine, triethyl phosphite, triethanol amine, cyclic ether, ethylene diamine, n-glyme, hexaphosphotriamide, nitrobenzene derivatives, sulfur, quinine imine dye, N-substituted oxazolidinone, N,N-substituted imidazolidine, ethylene glycol dialkyl ether, ammonium salt, pyrrole, 2-methoxy ethanol, or aluminum trichloride may further be added to the non-aqueous electrolyte in order to improve charge/discharge characteristics and inflammability. In certain embodiments, a halogen-containing solvent such as carbon tetrachloride or ethylene trifluoride may further be included in order to provide inflammability. In order to improve high-temperature storage characteristics, carbon dioxide gas may further be included.

The following examples illustrate the present embodiments in further detail, but it is understood that the present disclosure is not limited by these examples.

Preparation of Solvent-Insoluble Pore Forming Materials

Preparation Example 1-1: Preparation of Single-Phase Pore Forming Material

To a flask were added 70 g of pure water as a solvent; 6.42 g of methyl methacrylate and 3.21 g of styrene as monomers; 0.36 g of sodium dioctyl sulfosuccinate as an emulsifier; 6 mg of potassium persulfonate as a polymerization initiator and 4 mg of sodium bisulfite as a molecular weight adjusting agent and the resulting mixture was stirred. To an injection vessel were added 12.0 g of methyl methacrylate and 6.0 g of styrene as monomers; and 2.0 g of trimethylolpropane triacrylate as a crosslinking agent, and then mixed by stirring for 0.5 hour.

Nitrogen gas was injected into the stirred reaction vessel and the temperature of the reaction vessel was elevated to 80° C., followed by slowly injecting the monomers in the injection vessel for 2 hours.

After the injection was completed, the temperature of the reaction vessel was maintained at 80° C. for 30 minutes, followed by polymerization.

Thereafter, the reaction vessel was cooled to room temperature, and the emulsified polymer was filtered to remove some lumps, thereby preparing a single-phase solution of the solvent-insoluble pore forming material having 30% of solid matter.

Preparation Example 1-2: Preparation of Single-Phase Pore Forming Material Powder Filtration of 20 g of a single-phase solution of the solvent-insoluble pore forming material having 30% of solid matter prepared in Preparation Example 1-1 was accomplished under vacuum using an alumina filter sheet having a pore size of 200 nm.

During the filtration under vacuum, unreacted products and the emulsifier were removed by rinsing with large amounts of ethanol and water.

The filtered reaction product was dried in a vacuum oven at 60° C. for 24 hours, thereby obtaining a pore forming material in the form of a nano-powder.

A weight average molecular weight and an average particle size of the pore forming material in the form of a nano-powder were 1,600,000 g/mol and 80 nm, as measured by gel permeation chromatography (GPC) and a particle size analyzer, respectively.

Preparation Example 1-3: Preparation of Organic-Inorganic Hybrid Pore Forming Material In order to improve dispersibility of carbon nanotubes in pure water, acidic treatment was performed to prepare a multiple-walled carbon nanotubes (MWNT) having a carboxyl group added thereto.

MWNT having a diameter of 10 to 20 nm and a length of 10 to 50 μm (3.5 g) was treated using 300 mL of a 20 wt % nitric acid solution at 40° C. for 24 hours and washed. The washed MWNT was immersed in 200 mL of a mixed solution including strong sulfuric acid and strong nitric acid mixed in a ratio of 3:1 (v/v %), sonicated at room temperature for 3 hours, stirred at 70° C. for 6 hours, filtered, washed using pure water and dried in a vacuum oven at 80° C. for 24 hours, thereby affording the MWNT derivatized with a carboxyl group.

To a flask were added 70 g of pure water as a solvent; 3.0 g of MWNT derivatized with a carboxyl group; and 1.0 g of sodium dodecyl benzene sulfonate as an emulsifier, the resulting mixture was sonicated for 10 minutes. To the reaction vessel were added 3.0 g of methyl methacrylate and 2.99 g of n-butyl methacrylate as monomers; 6 mg of potassium persulfonate as a polymerization initiator, and 4 mg of sodium bisulfite as a molecular weight adjusting agent were added to the reaction vessel. The resulting mixture was stirred. To an injection vessel were added 9.0 g of methyl methacrylate and 9.0 g of n-butyl methacrylate as monomers; and 2.0 g of trimethylolpropane triacrylate as a crosslinking agent. The resulting mixture was stirred for 6 hours.

Nitrogen gas was injected into the stirred reaction vessel and the temperature of the reaction vessel was elevated to 80° C., followed by slowly injecting the monomers in the injection vessel for 2 hours.

After the injection was completed, the temperature of the reaction vessel was maintained at 80° C. for 30 minutes, followed by polymerization.

Thereafter, the reaction vessel was cooled to room temperature, and the emulsified polymer was filtered to remove some lumps, thereby preparing an organic-inorganic hybrid pore forming material having 30% of solid matter.

A weight average molecular weight and an average particle size of the organic-inorganic hybrid pore forming material were 1,200,000 g/mol and 110 nm, as measured by gel permeation chromatography (GPC) and a particle size analyzer, respectively.

Solvent-Soluble Polymers

Preparation Example 2-1: Preparation of Organic Solvent-Soluble Polymer

To a reaction vessel equipped with a stirrer were added 15.6 g of oxydiphthalic anhydride (ODPA) (Mw=310.21) and 145.1 g of purified N-methyl pyrrolidone (NMP). The solid material was completely dissolved by stifling at room temperature under stream of nitrogen, followed by injecting 10.0 g of 4,4'-methylene dianiline (MDA) (Mw=198.26).

Thereafter, the resultant mixture was stirred at room temperature for 12 hours, thereby preparing a polyamic acid binder solution with 15% of solid matter dissolved in NMP.

A weight average molecular weight of the binder solution was 135,000 g/mol, as measured by gel permeation chromatography (GPC).

Preparation Example 2-2: Preparation of Soluble Binder

To a reaction vessel equipped with a stirrer was added 100 g of (organic solvent-soluble) polyamic acid binder dissolved in NMP, prepared in Preparation Example 2-1, and 40 mL of 1M NH$_4$OH solution was slowly injected thereto with stirring.

Thereafter, the resultant mixture was stirred at room temperature for 6 hours and slowly poured into a vessel containing 2L acetone with stifling to afford a precipitate.

Next, the precipitate was filtered, washed and dried in a vacuum oven at 60° C. for 3 hours, thereby obtaining powder.

A 10 g portion of the obtained powder was dissolved in 90 g of pure water, thereby preparing an aqueous binder solution having 10% of solid matter.

Preparation of Binder Compositions

Preparation Example 3-1: Preparation of Binder Composition by Mixing

To a stirrer vessel were added 4.0 g of the single-phase solution of the solvent-insoluble pore forming material having 30% of solid matter (prepared in Preparation Example 1-1), and 48 g of the aqueous binder solution having 10% of solid matter (prepared in Preparation Example 2-2), and then 8 g of pure water was added while slowly stirring for 1 hour, thereby preparing a negative electrode forming binder composition, which has 10% of solid matter and in which the pore forming material is dispersed in an aqueous solution.

Preparation Example 3-2: Preparation of Binder Composition by Mixing

The negative electrode forming binder composition was prepared in the same manner as in Preparation Example 3-1, except that the pore forming material solution having 30% of solid matter, prepared in Preparation Example 1-3 was used, instead of the single-phase solution of the solvent-insoluble pore forming material, which has 30% of solid matter, prepared in Preparation Example 1-1.

Preparation Example 3-3: Preparation of Binder Composition by Mixing

To a stirrer vessel was added 12.0 g of the single-phase solution of the solvent-insoluble pore forming material having 30% of solid matter (prepared in Preparation Example 1-1), and 24 g of the aqueous binder solution having 10% of solid matter (prepared in Preparation Example 2-2), and then 24 g of pure water was added while slowly stifling for 1 hour, thereby preparing the negative electrode forming binder composition, which has 10% of solid matter and in which the pore forming material is dispersed in an aqueous solution.

Preparation Example 3-4: Preparation of Binder Composition by Mixing

To a stirrer vessel was added 0.8 g of the single-phase solution of the solvent-insoluble pore forming material having 30% of solid matter (prepared in Preparation Example 1-1), and 57.6 g of the aqueous binder solution having 10% of solid matter (prepared in Preparation Example 2-2), and then 1.6 g of pure water was added while slowly stirring for 1 hour, thereby preparing the negative electrode forming binder composition, which has 10% of solid matter and in which the pore forming material is dispersed in an aqueous solution.

Preparation Example 3-5: Preparation of Binder Composition by Preparing Solvent-Soluble Polymer in Presence of Pore Forming Material To a reaction vessel equipped with a stirrer was added 1.2 g of a pore forming material in the form of nano-powder (prepared in Preparation Example 1-2), dissolved in 54 g of NMP, sonicated under stream of nitrogen for 3 hours, thereby uniformly dispersing the pore forming material in NMP.

To the reaction vessel were added 2.93 g of oxydiphthalic anhydride (ODPA) and 1.88 g of 4,4'-methylene dianiline (MDA) and stirred at room temperature for 12 hours, thereby preparing the negative forming binder composition having 10% of solid matter, in which the pore forming material in the form of nano-powder is dispersed in a polyamic acid solution.

Preparation of Electrode Active Material Slurry

Example 1

To a vessel were added 12.5 g of the negative electrode forming binder composition having 10% of solid matter (prepared in Preparation Example 3-1), 12 g of Si-alloy as a negative electrode active material, 6 g of graphite and 1 g of ketjen as a conductive agent, to prepare a negative electrode slurry.

In preparing the slurry, a small amount of water was added to adjust an appropriate level of viscosity of the slurry.

The composition of the slurry is designed to allow an active material and a binder to have a ratio of 95:5 after forming an electrode.

Example 2

A negative electrode slurry was prepared in the same manner as in Example 1, except that instead of the negative electrode forming binder composition having 10% of solid matter, prepared in Preparation Example 3-1, the negative electrode forming binder composition, prepared in Preparation Example 3-2, was used.

Example 3

To a slurry forming vessel were added 12.5 g of the negative electrode forming binder composition having 10% of solid matter, prepared in Preparation Example 3-3, 12 g of Si-alloy as a negative electrode active material, 6 g of graphite and 1 g of ketjen as a conductive agent, to prepare a negative electrode slurry.

In preparing the slurry, a small amount of NMP was added to adjust an appropriate level of viscosity of the slurry.

Example 4

A negative electrode slurry was prepared in the same manner as in Example 1, except that instead of the negative electrode forming binder composition having 10% of solid matter, prepared in Preparation Example 3-1, the negative electrode forming binder composition, prepared in Preparation Example 3-4, was used.

Example 5

A negative electrode slurry was prepared in the same manner as in Example 1, except that instead of the negative electrode forming binder composition having 10% of solid matter, prepared in Preparation Example 3-1, the negative electrode forming binder composition, prepared in Preparation Example 3-3, was used.

Comparative Example 1

A negative electrode slurry was prepared in the same manner as in Example 3, except that instead of the negative electrode forming binder composition having 10% of solid matter, prepared in Preparation Example 3-3, 6.7 g of the polyamic acid binder solution having 15% of solid matter, prepared in Preparation Example 2-1, was used.

Comparative Example 2

A negative electrode slurry was prepared in the same manner as in Comparative Example 1, except that the polyamic acid binder solution having 15% of solid matter, prepared in Preparation Example 2-1, was used in an amount of 13.3 g, instead of 6.7 g, 11 g of Si-alloy as a negative electrode active material, 6 g of graphite and 1 g of ketjen as a conductive agent, to prepare a negative electrode slurry.

The composition of the slurry is designed to allow an active material and a binder to have a ratio of 90:10 after forming an electrode.

Fabrication of Batteries

Each of the negative electrode slurry compositions prepared in Examples 1-3 and Comparative Examples 1-4 was coated on a copper (Cu) foil and dried at 110° C. for 30 minutes, followed by punching, pressing, welding and vacuum-drying (VD) in a vacuum oven at a drying temperature of 450° C. for one hour for fabricating a coin cell, thereby forming a negative electrode.

The thus-formed negative electrode for a lithium rechargeable battery was used with a lithium (Li) metal as a counter electrode and a porous polypropylene film as a separator, fabricating a half-cell of the lithium rechargeable battery.

Here, a mixed solution containing ethylene carbonate in which 1M $LiPF_6$ was dissolved, and diethylene carbonate in a volume ratio of 1:1 was used as an electrolyte. Cell assembly was performed in a globe box filled with argon gas, and after the cell assembly, battery properties were evaluated using a charge/discharge device for 100 mA.

Identification of Properties of Binder Composition

Experimental Example 1

Pyrolysis temperatures of the organic solvent pore forming materials prepared in Preparation Examples 1-1 and 1-3 and the organic solvent-soluble polymers prepared in Preparation Examples 2-1 and 2-2 were measured in the following manner, and the measurement results are shown in Table 1.

Approximately 3 g of each of the prepared components was taken in an aluminum vessel, the temperature was elevated up to 400° C. in a vacuum sintering furnace at a rate of 20° C./min, and the temperature of 400° C. was maintained for 10 minutes, followed by natural cooling. Thereafter, samples were heated, and final weights of the samples were compared with initial weights thereof.

TABLE 1

|  | Sample weight before heating | Sample weight after heating | Solid residue (%) |
|---|---|---|---|
| -1 | 2.97 g | 0.027 g | 3% |
| 1-3 | 2.98 g | 0.032 g | 4% |
| 2-1 | 3.02 g | 0.444 g | 98% |
| 2-2 | 3.00 g | 0.285 g | 95% |

Evaluation of Electrolyte Immersion Speed

Experimental Example 2

A 1 microliter (μL) aliquot of the electrolyte used in fabricating the batteries was dropped on each of the negative electrodes fabricated in fabricating the batteries using a syringe, and a time required for the electrolyte to be absorbed into an electrode was measured for relative evaluation of electrolyte immersion speeds, and the evaluation results are shown in Table 2.

TABLE 2

Immersion time of Electrolyte in Electrode

|  | electrolyte immersion time (sec) |
|---|---|
| Example 1 | 46 |
| Example 2 | 55 |
| Example 3 | 52 |
| Example 4 | 78 |
| Example 5 | 36 |
| Comparative Example 1 | 87 |
| Comparative Example 2 | 210 |

As indicated from the results shown in Table 2, the electrode fabricated using the slurry prepared in Example 5 showed the highest electrolyte immersion speed, which may be because the electrode is most highly porous by the largest amount of the pore forming material contained in the binder composition (60 wt % based on the total weight of the binder). Conversely, the electrode fabricated using the slurry prepared in Comparative Example 2 showed the lowest electrolyte immersion speed, which may be because no pore forming material was contained in the binder composition, and a relatively large amount of the binder was used.

When comparing the Examples 1-3 (in which pore forming material was contained in electrodes) to Comparative Example 1 (in which pore forming material was not contained in the same amount of binder composition), and Example 4 in which a pore forming material was used in a small amount (4 wt % based on the total weight of binder composition), the electrolyte immersion speeds of the electrodes fabricated using the slurry including the pore forming material, prepared in Examples 1-3 were high. This is presumably because the electrode having uniformly distributed pores shows a higher electrolyte immersion than the electrode having non-uniformly distributed pores.

Evaluation of Battery Properties

Experimental Example 3

In order to investigate initial formation efficiency, the batteries fabricated using the electrodes prepared in Examples and Comparative Examples were charged and discharged at 0.2 C at room temperature (25° C.). In addition, in order to evaluate discharge capacity retention rate, the batteries were charged at 0.5 C and discharged at 1.0 C. During the charging, the batteries were fully charged with a constant current and an upper limit voltage of 0.01 V. During the discharging, the batteries were discharged with a constant current to reach 1.4 V. Charging and discharging of the batteries was performed 50 cycles to evaluate charging/discharging cycle characteristics. For more accurate evaluation, 4 cells were fabricated under the same conditions and the evaluation results of average values are shown in Table 3.

TABLE 3

|  | Initial formation efficiency (%) | Initial discharging capacity (mAh/g) | Discharging capacity @ 50 cycles (mAh/g) | Discharging capacity retention rate @ 50 cycles (%) |
|---|---|---|---|---|
| Example 1 | 87 | 1075 | 924 | 86% |
| Example 2 | 90 | 1110 | 988 | 89% |
| Example 3 | 88 | 1094 | 941 | 86% |
| Example 4 | 86 | 1058 | 762 | 72% |
| Comparative Example 1 | 85 | 1046 | 722 | 69% |
| Comparative Example 2 | 82 | 948 | 815 | 86% |

As indicated from the evaluation results shown in Table 1, the electrodes using the slurry prepared in Examples 1 to 4 had increased initial formation efficiency, compared to the electrodes using the slurry prepared in Comparative Examples 1 and 2.

The electrodes using the slurry prepared in Examples 1 to 4 are porous electrodes having uniformly distributed pores, making Li ions move more smoothly in comparison to the electrodes using the slurry prepared in Comparative Examples 1 and 2, thereby demonstrating increased initial formation efficiency.

From the viewpoint of discharge capacity retention rate, as confirmed from the evaluation results shown in Table 1, the electrodes using the slurry prepared in Examples 1 to 4 had far superior discharge capacity retention rates than the electrodes using the slurry prepared in Comparative Examples 1 and 2.

Since the electrodes using the slurry prepared in Examples 1 to 4 are porous electrodes having uniformly distributed pores, uniformly eliminating strains created during expansion and shrinkage of an active material in charging/discharging batteries, the cycle life of battery can be improved.

When the electrode using the slurry prepared in Example 4 is compared with the electrode using the slurry prepared in Comparative Example 1, the electrode of Example 4 in which the pore forming material is used even in a small amount has better battery performance than the electrode of Comparative Example 1 in which pore forming material is not used.

When the electrode using the slurry prepared in Comparative Example 1 is compared with the electrode using the slurry prepared in Comparative Example 2, the electrode of Comparative Example 1 is better than the electrode of Comparative Example 2 from the viewpoints of initial formation efficiency and initial discharge capacity. However, the discharging capacity retention rate of the electrode of Comparative Example 1 is lower than that of the electrode of Comparative Example 2. This is presumably because the cycle life is lowered due to shortage of the binder relative to the active material.

Consequently, as shown in Tables 2 and 3, the electrode having uniformly distributed pores according to the present invention demonstrated increased injection efficiency and improved initial formation efficiency and life characteristic even if the binder is used for the electrode in a small amount. That is to say, the uniformly distributed pores of the electrode facilitates electrolyte immersion and Li ion movement, and the cycle life can be improved by maintaining a conductive path by uniformly eliminating the strains created during expansion and shrinkage of an active material in charging/discharging batteries. In addition, the battery capacity can be increased using the active material in a relatively large amount.

Certain embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A binder composition for a rechargeable battery, the binder composition comprising a solvent-insoluble pore forming material and a solvent-soluble polymer,
   wherein the solvent is selected from the group consisting of water, N,N-dimethyl formamide, N,N-dimethylacetamide, methylethyl ketone, cyclohexanone, ethyl acetate, butyl acetate, cellosolve acetate, propylene glycol monomethyl ether acetate, methyl cellosolve, butyl cellosolve, methyl carbitol, butyl carbitol, propylene glycol monomethyl ether, diethylene glycol dimethyl ether, toluene, and xylene,
   wherein the solvent-soluble polymer includes at least one component selected from a group consisting of poly(acrylether ketones), poly(arylamides), aromatic polyamides, aromatic poly(amide-imides), aromatic polyurethanes, aromatic polyesters, polybenzimidazoles, polybenzoxazoles, polybenzothiazoles, aromatic polysulfones, aromatic poly(ethersulfones), aromatic poly(phenylene sulfides) and aromatic polyphosphazene,
   wherein the solvent-insoluble pore forming material is unpyrolyzed and the solvent-insoluble pore forming material is pyrolyzed when the binder composition is pyrolyzed above 400 degrees Celsius during annealing after it is coated on an electrode current collector, and
   wherein the solvent-insoluble pore forming material is a mixture of two or more kinds of materials having different pyrolysis characteristics.

2. The binder composition of claim 1, wherein the solvent-soluble polymer is pyrolyzed in an amount of less than 10% by weight and the solvent-insoluble pore forming material is pyrolyzed in an amount of greater than 90% by weight, based on the weight of the binder before pyrolyzation.

3. The binder composition of claim 1, wherein the solvent-soluble polymer and the solvent-insoluble pore forming material are mixed in a weight ratio of 50: 50 to 95: 5 based on a total weight of solid matter.

4. The binder composition of claim 1, wherein the polymer includes one or more components selected from the group consisting of a polymer having a fluoride substituted, a polymer including a sulfone group ($-SO_2-$) in a main chain, and a block copolymer having another polymer added in the form of a block to the polymer.

5. The binder composition of claim 1, wherein the solvent-insoluble pore forming material is a polymer or an organic-inorganic hybrid.

6. The binder composition of claim 1, wherein the solvent-insoluble pore forming material is dispersed in a solution.

7. The binder composition of claim 1, wherein the solvent-insoluble pore forming material includes nano particles having a size of 10 to 200 nm.

8. The binder composition of claim 1, wherein the solvent-insoluble pore forming material is spherically shaped.

9. The binder composition of claim 1, wherein the solvent-insoluble binder and the solvent-insoluble pore forming material are dispersed in a same solvent.

10. The binder composition of claim 1, wherein the binder composition further comprises at least one additive selected from a dispersant, a viscosity agent, a conductive agent and a filler.

11. The binder composition of claim 10, wherein the additive is used in an amount of 0.1 to 10 wt% based on the weight of binder composition excluding a solvent.

12. A rechargeable battery comprising:
    a positive electrode;
    a negative electrode: and
    an electrolyte,
    wherein at least one of the positive electrode and the negative electrode includes a porous electrode fabricated using the binder composition of claim 1.

13. The rechargeable battery of claim 12, wherein at least one of the positive electrode and the negative electrode has porosity of from about 5 to about 30vol % based on the total volume of the at least one of the positive electrode and the negative electrode.

14. A method of producing an electrode of a rechargeable battery, comprising:
    preparing an electrode active material slurry by mixing an electrode active material and the binder composition of claim 1; and
    coating the electrode active material slurry on a electrode current collector and drying.

15. The binder composition of claim 1, wherein the solvent-soluble polymer is not pyrolyzed at less than 400° C. under vacuum.

* * * * *